(12) United States Patent
Pravahan

(10) Patent No.: US 11,054,289 B2
(45) Date of Patent: Jul. 6, 2021

(54) SENSOR CALIBRATION

(71) Applicant: AT&T Intellectual Property I, L.P., Atlanta, GA (US)

(72) Inventor: Rishiraj Pravahan, Palo Alto, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1496 days.

(21) Appl. No.: 14/301,420

(22) Filed: Jun. 11, 2014

(65) Prior Publication Data

US 2015/0362346 A1 Dec. 17, 2015

(51) Int. Cl.
*G01D 18/00* (2006.01)
*G01D 21/00* (2006.01)

(52) U.S. Cl.
CPC .............. *G01D 18/00* (2013.01); *G01D 21/00* (2013.01)

(58) Field of Classification Search
CPC ...................................................... G01D 18/00
See application file for complete search history.

(56) References Cited

U.S. PATENT DOCUMENTS

| | | | | |
|---|---|---|---|---|
| 8,438,502 | B2 * | 5/2013 | Friedman | G06F 3/04845 715/848 |
| 8,626,465 | B2 * | 1/2014 | Moore | G01K 7/42 702/141 |
| 8,676,528 | B2 | 3/2014 | Almalki et al. | |
| 8,760,521 | B2 * | 6/2014 | Medeiros | G06T 7/292 348/187 |
| 9,631,956 | B2 * | 4/2017 | Mihelich | G01D 18/00 |
| 2009/0190046 | A1 * | 7/2009 | Kreiner | H04N 9/3182 348/789 |
| 2010/0235129 | A1 | 9/2010 | Sharma et al. | |
| 2012/0101762 | A1 | 4/2012 | Almalki et al. | |
| 2013/0116958 | A1 * | 5/2013 | Kristensson | H04B 5/0075 702/85 |
| 2013/0211761 | A1 | 8/2013 | Brandsma et al. | |
| 2013/0320966 | A1 | 12/2013 | Oliver et al. | |
| 2014/0012529 | A1 | 1/2014 | Lee et al. | |
| 2014/0032154 | A1 | 1/2014 | Peng et al. | |
| 2014/0288896 | A1 * | 9/2014 | Li | G01C 19/38 703/2 |

(Continued)

FOREIGN PATENT DOCUMENTS

| | | |
|---|---|---|
| WO | WO 2013023298 | 2/2013 |
| WO | WO 2013068873 | 5/2013 |

OTHER PUBLICATIONS

Pawel Fotowicz, Systematic Effect as a Part of the Coverage Interval, Metrology and Measurement Systems, vol. XVII(2010), No. 3, pp. 439-446 (Year: 2010).*

(Continued)

*Primary Examiner* — Manuel A Rivera Vargas
*Assistant Examiner* — Yaritza H Perez Bermudez
(74) *Attorney, Agent, or Firm* — Amin, Turocy & Watson, LLP

(57) ABSTRACT

Sensory outputs are corrected to reflect true values. One or more correction factors may be determined and applied to sensory outputs to ensure a true value is obtained. A reconstruction algorithm maps the sensory outputs to a quantity of interest, such that the true value of the quantity of interest is within error bounds of a reconstructed value.

20 Claims, 9 Drawing Sheets

(56) References Cited

U.S. PATENT DOCUMENTS

2015/0234069 A1* 8/2015 Ramakrishnan ....... G01V 1/306
　　　　　　　　　　　　　　　　　　　　　　702/6
2015/0254523 A1* 9/2015 Nakamura .............. G06T 5/004
　　　　　　　　　　　　　　　　　　　　　　382/199

OTHER PUBLICATIONS

Miluzzo et al., "CaliBree: a Self-Calibration System for Mobile Sensor Networks," Lecture Notes in Computer Science vol. 5067, 2008, pp. 314-331.
Whitehouse et al., "Calibration as Parameter Estimation in Sensor Networks," Sep. 28, 2002, WSNA '02 Proceedings of the 1st ACM International Workshop on Wireless Sensor Networks and Applications, pp. 59-67.

* cited by examiner

SENSOR CALIBRATION

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Sensors are ubiquitous in today's world. Temperature sensors monitor our comfort, health sensors monitor our blood pressure, and our mobile devices monitor our location. All sorts of machines and/or computers use sensory outputs to improve our lives. However, if the sensory outputs are inaccurate, machines can make incorrect decisions.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
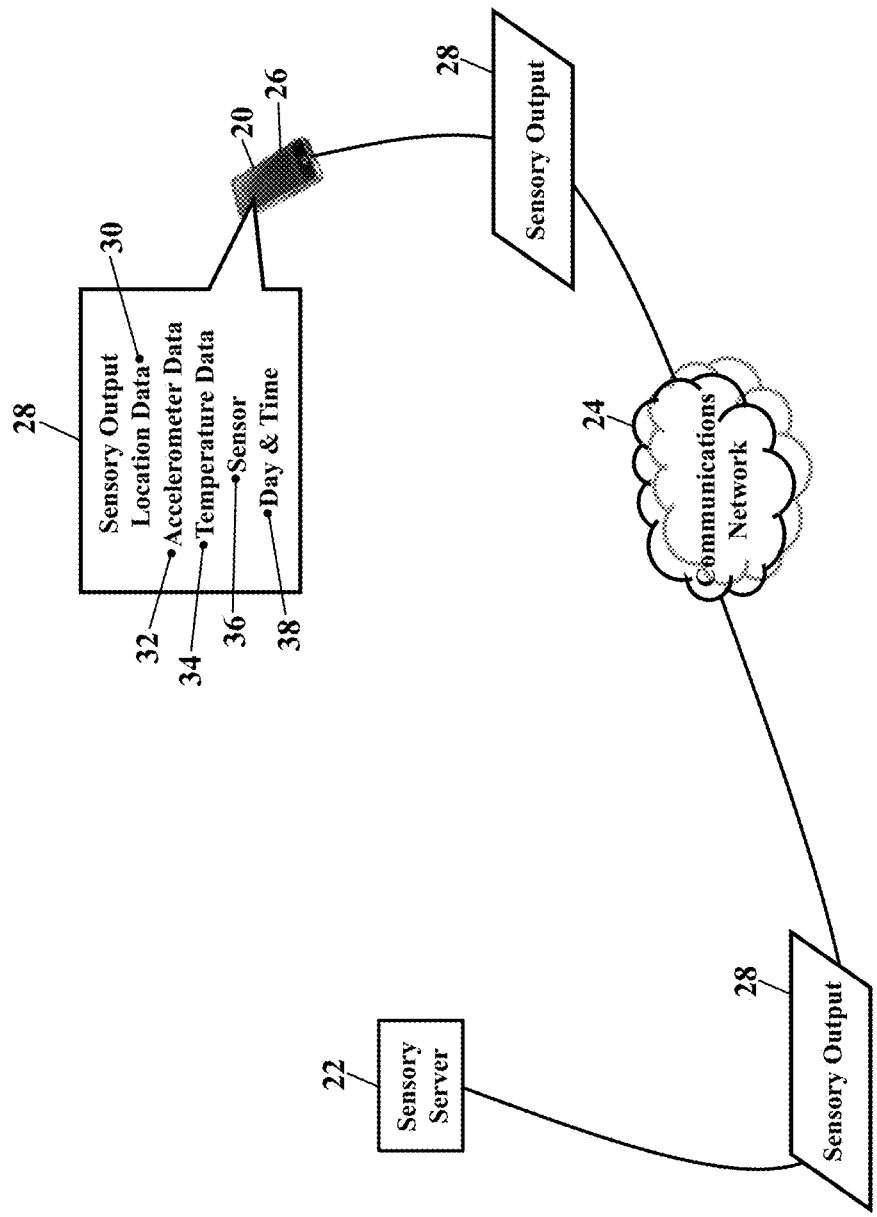
FIGS. 1-2 are simplified schematics illustrating an environment in which exemplary embodiments may be implemented.
Figure 2:
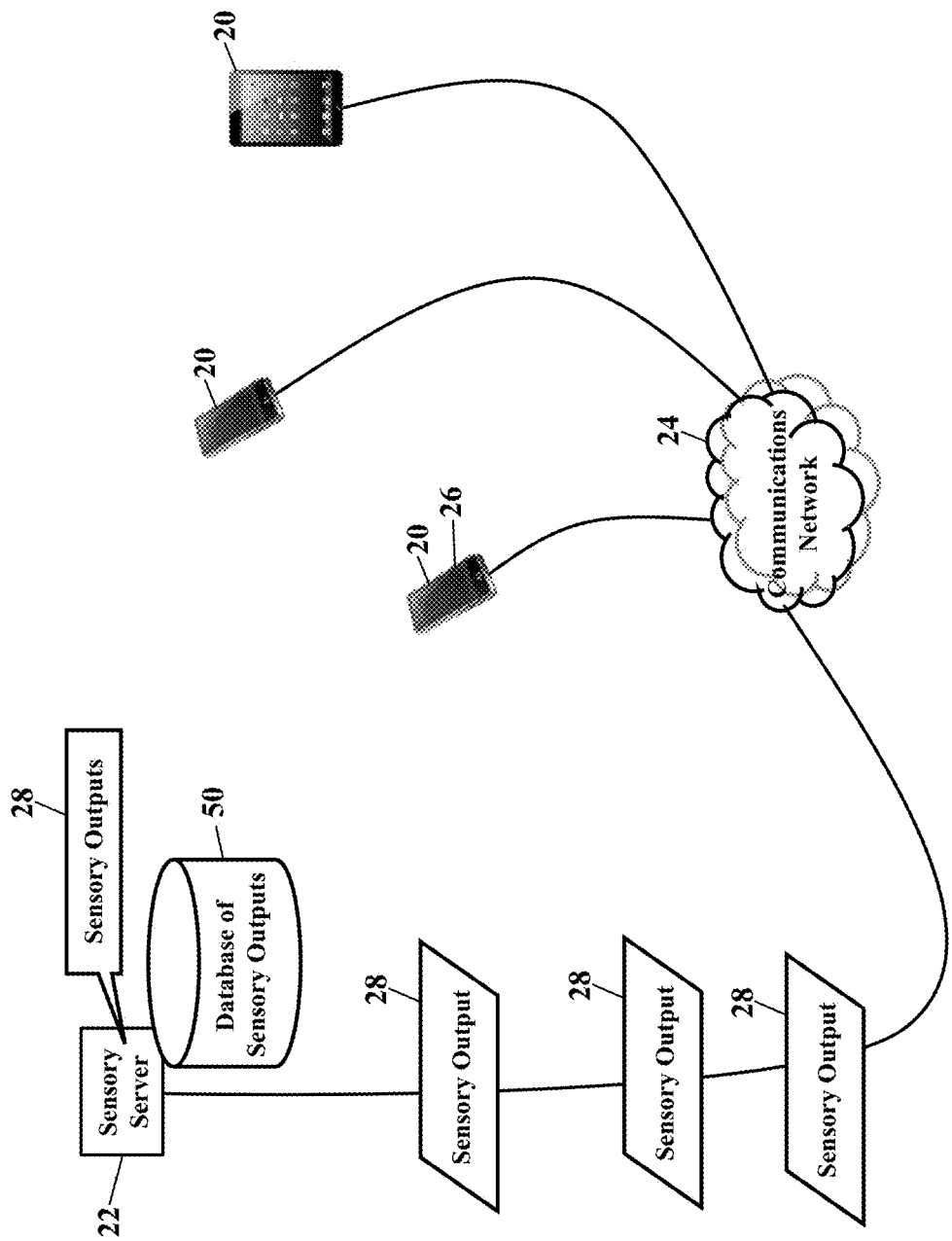

FIGS. 1-2 are simplified schematics illustrating an environment in which exemplary embodiments may be implemented. FIG. 1 illustrates a device 20 that communicates with a sensory server 22 using a communications network 24. The device 20, for simplicity, is illustrated as a mobile smartphone 26. The device 20, though, may be any mobile or stationary processor-controlled device or machine (as later paragraphs will explain). As the device 20 operates, the device 20 collects any kind of sensory output 28. The smartphone 26, for example, detects location data 30 from a global positioning system (GPS), accelerometer data 32 from an accelerometer, and temperature data 34 from a temperature sensor. Indeed, the device 20 may have any sensor 36 that collects or generates any type of the sensory output 28. The smartphone 26 may also collect or determine a day and time 38 from an internal clock and/or from the communications network 24. Whatever sensory output 28 is collected, the device 20 may randomly or periodically report the sensory output 28 to a network address (such as an Internet Protocol) of the sensory server 22 for analysis.

FIG. 2 illustrates crowd reporting. As the reader likely knows, the sensory outputs 28 may be collected from many devices 20. Exemplary embodiments permit any mobile or stationary device 20 to send its respective sensory output 28 to the sensory server 22. FIG. 2, for simplicity, only illustrates a few different mobile devices 20. In practice, though, there may be hundreds, thousands, or even millions of devices 20 reporting their respective sensory output 28 to the sensory server 22. Machines in factories, appliances in homes, and even cars on roadways are just some examples of the devices 20 that report their sensory outputs 28 to the sensory server 22. Whatever the device 20, the sensory server 22 stores each device's sensory output 28 in a database 50 of sensory outputs.

Figure 3:
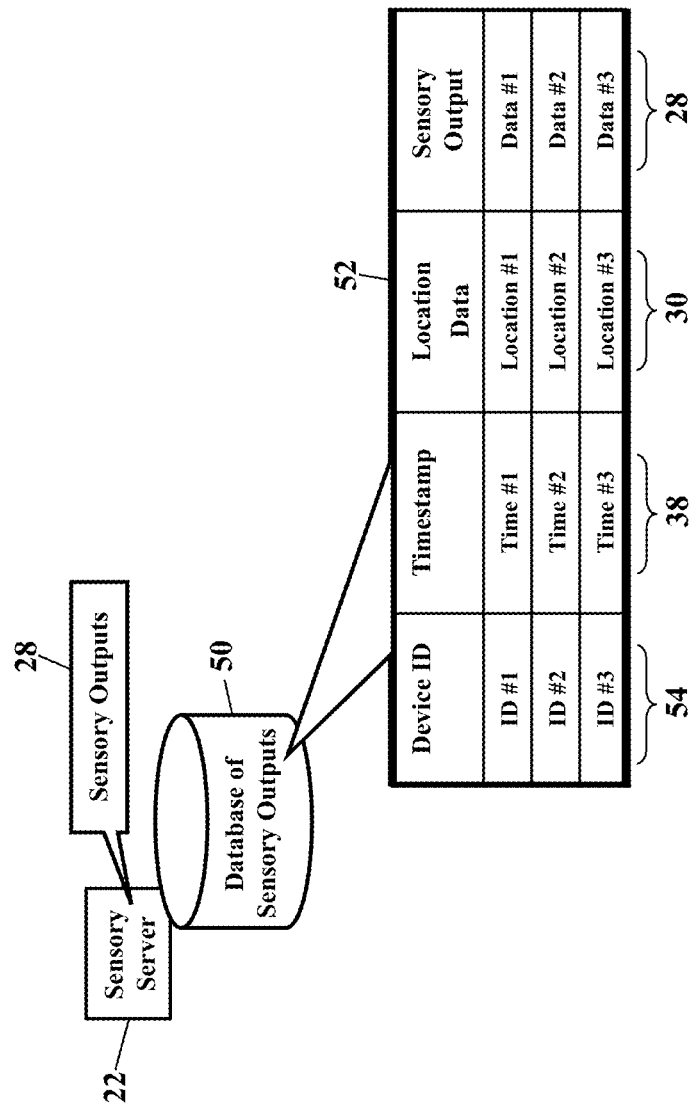
FIG. 3 is a detailed schematic illustrating a database of sensory outputs, according to exemplary embodiments.

FIG. 3 is a more detailed schematic illustrating the database 50 of sensory outputs, according to exemplary embodiments. FIG. 3 illustrates the database 50 of sensory outputs as a table 52 that maps or relates each device's sensory output 28 to each device's corresponding location data 30 and to each device's corresponding device identifier 54. The database 50 of sensory outputs, for example, may associate each device's unique network address (such as an Internet Protocol address) to each device's corresponding sensory outputs 28 reported at each device's corresponding current GPS location 30. The device identifier 54, of course, may be any other alphanumeric combination that uniquely differentiates one device 20 from another. The database 50 of sensory outputs may thus be a central, network repository that stores the sensory outputs 28 from different reporting devices 20. The database 50 of sensory outputs may aggregate any reports having some matching or similar association, such as nearly the same geographic location 30, timestamp 38, and/or any other parameter. Some different locations, for example, may be considered as matching within a common radius or distance from a coordinate, street, or building. The sensory server 22 may thus receive a query specifying a query parameter, and the sensory server 22 retrieves and responds with any sensory outputs 28 matching the query parameter.

Figure 4:
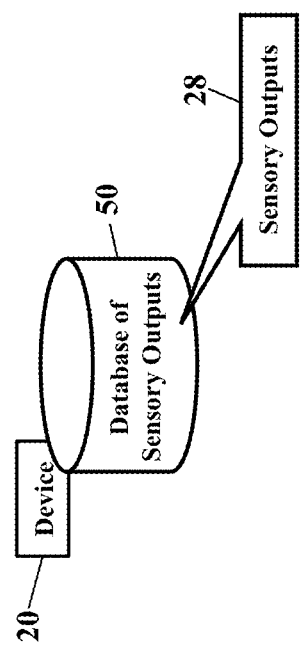
FIGS. 4-5 are schematics illustrating alternate operating environments, according to exemplary embodiments.
Figure 5:
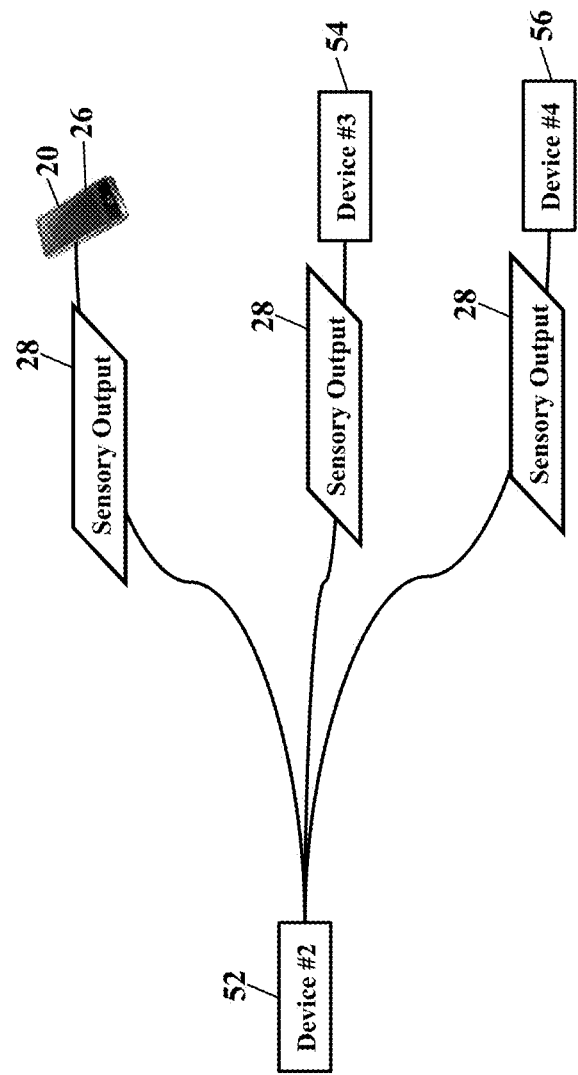

FIGS. 4-5 are schematics illustrating alternate operating environments, according to exemplary embodiments. Here the database 50 of sensory outputs may be at least partially stored in local memory of the device 20. That is, any device 20 may locally store and maintain some or all of the database 50 of sensory outputs. FIG. 5 illustrates a peer environment in which the device 20 may receive the sensory outputs 28 from different peer devices 52, 54, and/or 56. Any one of the peer devices 52, 54, and/or 56 may thus send its respective sensory output 28 to the device 20 for analysis. Indeed, the device 20 may query the one or more peer devices 52, 54, and/or 56 to retrieve the sensory outputs 28.

Figure 6:
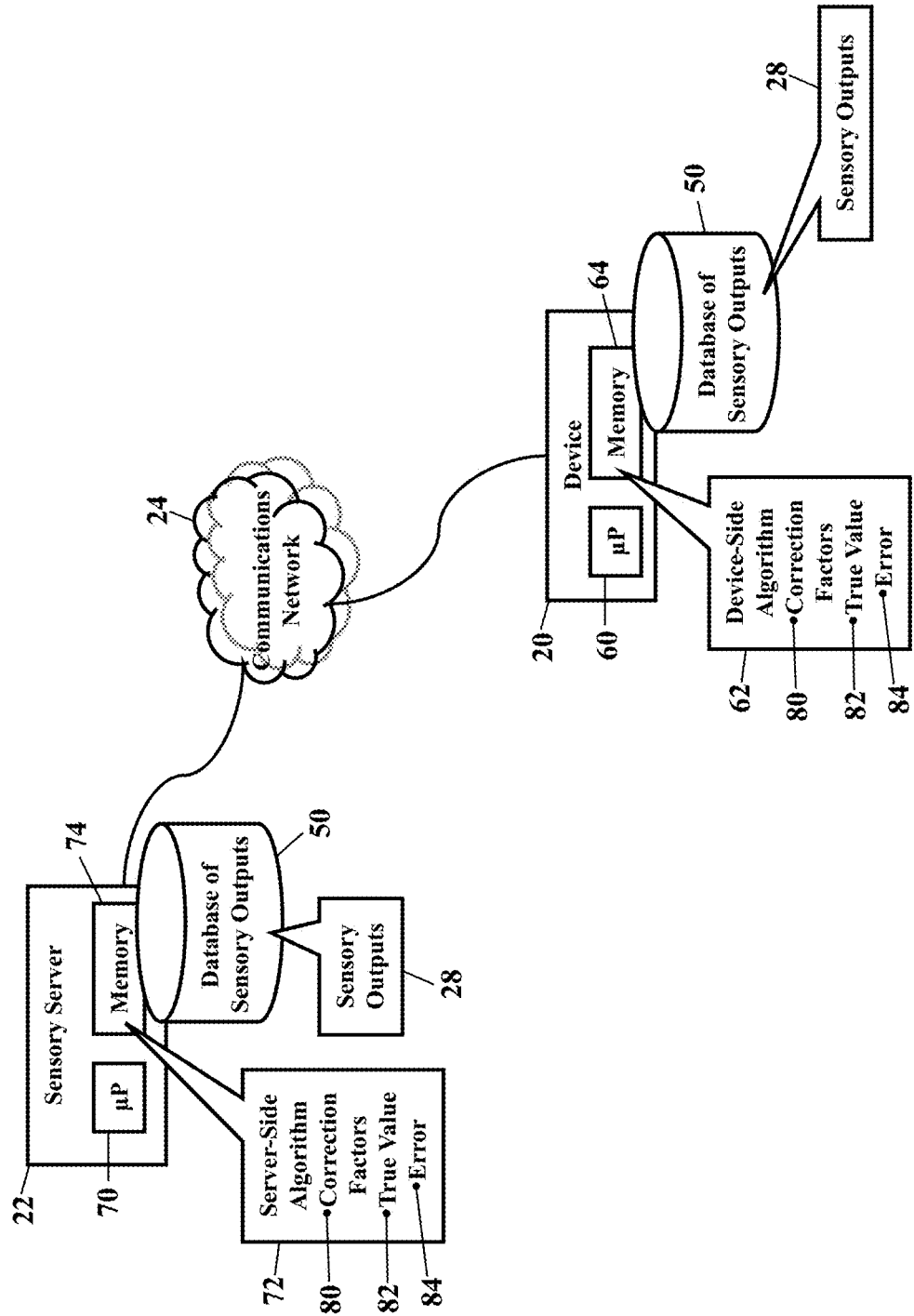
FIG. 6 is a more detailed schematic illustrating the operating environment, according to exemplary embodiments.

FIG. 6 is a more detailed schematic illustrating the operating environment, according to exemplary embodiments. Whatever the operating environment, the device 20 may have a processor 60 (e.g., "µP"), application specific integrated circuit (ASIC), or other component that executes a device-side algorithm 62 stored in a local memory 64. The sensory server 22 may also have a processor 70 (e.g., "µP"), application specific integrated circuit (ASIC), or other component that executes a server-side algorithm 72 stored in a local memory 74. The device-side algorithm 62 and the server-side algorithm 72 may thus include instructions, code, and/or programs that may cooperate, via the communications network 24, to correct any one of the sensory outputs 28 stored in the database 50 of sensory outputs.

Any of the sensory outputs 28 may need correction. Whatever the operating environment, the sensor outputs 28 may need to be calibrated to ensure they reflect actual, real world values. That is, exemplary embodiments may determine one or more correction factors 80 that are applied to the sensor outputs 28 to ensure a true value 82 is obtained. Modern society is quickly transitioning to the "Internet of things," where sensors are one of the largest sources of data. Large radio antennas, short range radio frequency chips, accelerometers on mobile telephones, and magnetic strips are only some examples of the vast array of sensors collecting the sensory outputs 28. This massive collection of data, as well as processing them, result in inaccuracies in measurement and systematic errors.

The sensory outputs 28 should be as accurate as possible. As the reader understands, even a small error 84 in any of the sensory outputs 28 may cause incorrect, or perhaps catastrophic, results. An incorrect temperature reading, as a simple example, may cause an HVAC system to heat or cool to discomfort. A temperature sensor thus needs to generate an accurate output reading that is close to an actual, ambient temperature of a room. More seriously, an incorrect position reading may cause a stamping machine to improperly operate, thus jeopardizing an operator's life. Many defects, systematic problems, or malfunctions are easy for humans to observe and catch (usually based on prior experience/intuition). Machines, however, often have no such built-in intuition for improper measurements. Whatever the device 20, the device 20 should have intelligence that recognizes incorrect and/or inaccurate values in the sensory outputs 28. Moreover, exemplary embodiments even allow the device 20 to correct itself, as this disclosure below explains.

Exemplary embodiments thus correct any one of the sensory outputs 28. Whatever the sensory outputs 28, the sensory server 22 may calibrate any of the sensory outputs 28 to the true value 82. According to exemplary embodiments, the sensory outputs 28 may be cross-calibrated and correctly analyzed to reflect the real ambient conditions being measured. Such calibrations enable any device 20 to make correct, intelligent decisions based on the true value 82. Exemplary embodiments thus allow any device 20 to correctly infer the true value 82 and any aberration from the true value 82, with minimal or no human interaction. Exemplary embodiments may cross-reference any of the sensory outputs 28 in the database 50 of sensory outputs. Exemplary embodiments thus ensure that any device 20 makes more correct decisions based on the sensory outputs 28 than today without such in-situ measures. Whatever the sensory output 28, its corresponding true value 82 is determined based on in situ simulations and/or peer to peer communications between any of the devices 20. Exemplary embodiments may thus correct for all possible systematics associated with the sensory outputs 28. Exemplary embodiments may iteratively calculate a common variable using at least two sets of sensory outputs 28 from different devices 20. The device-side algorithm 62 and/or the server-side algorithm 72 may correct each other to get to an accurate measurement. Software decisions, made based on these more accurate values, will ensure reliability in the network ecosystem.

Exemplary embodiments enhance the trustworthiness of machines. As machine-to-machine communication and decision-making becomes more dominant, exemplary embodiments help ensure reliability and accuracy of the sensory outputs 28 generated by any of the devices 20. Any machine-to-machine intelligent, software-based decisions rely on the reliability and accuracy of the sensory outputs 28. For example, a network of sensors monitoring an elderly person's household should be reliable enough to automatically report accidents. Exemplary embodiments thus ensure that the sensory outputs 28 are accurate and thereby enable devices and machines to make correct decisions through a peer-to-peer interaction.

Exemplary embodiments may be applied to any technology and industry. Given the enormous amount of data that will be generated by machines using sensors, exemplary embodiments are invaluable for any machine-to-machine ecosystem. For example, exemplary embodiments may be applied to any manufacturing, telecommunications, healthcare, home-digitization, and automotive technology.

Exemplary embodiments may be applied regardless of networking environment. As the above paragraphs mentioned, the communications network 24 may be a wireless network having cellular, WI-FI®, and/or BLUETOOTH® capability. The communications network 24, however, may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards, GSM/CDMA/TDMA or any cellular standard, and/or the ISM band). The communications network 24 may even include power line portions, in which signals are communicated via electrical wiring. The concepts described herein may be applied to any wireless/wireline communications network, regardless of physical componentry, physical configuration, or communications standard(s).

The device-side algorithm 62 and/or the server-side algorithm 72 are now described in detail. Assume that a collection of sensors $S_i$ collects a set of data points $S_i^j$ measured in arbitrary units. Also assume an interest in measuring some quantity $Q_R=R(S_i^j)$, which is obtained using a reconstruction algorithm R applied on one or more of the measured sensory outputs 28. The collection of sensors $S_i$ may be associated with, or retrieved from, a single device 20 or from multiple devices 20. The set of data points $S_i^j$, likewise, may be associated with, or retrieved from, a single device 20 or from multiple devices 20. The set of data points $S_i^j$ may also be one or more data points representing output data from a single sensor (such as a temperature sensor in a single device 20 or data from multiple sensors in the single device 20 or in multiple devices 20). Regardless, exemplary embodiments may use either an alternate orthogonal measurement of Q that may be independent of the sensory data, or exemplary embodiments may use a simulation of the sensor data starting with a known or true set of values of the quantity of interests Q can be performed. The orthogonal measurement will be referred to as the true value 82 of the quantity of interest $Q_T$. For the case of simulated data, the true values are generated whereas for cross-referenced data the true set refers to the subset of $Q_R$ that has matched values in the orthogonal dataset. It is then possible to say that, $$Q_R+\delta_1(Q_R)>Q_T>Q_R-\delta_2(Q_R) \quad \text{(Equation \#1)}$$

where the reconstruction algorithm R maps the sensory outputs 28 to the quantity of interest Q such that the true value 82 of the quantity Q is within the error bounds $\delta_1(Q_R)$, $\delta_2(Q_R)$ of the reconstructed value $Q_R$.

Exemplary embodiments may bin measurements. Let the range of values of the quantity of interest Q, which could represent either $Q_T$ or $Q_R$, be in the range $[Q^{MIN}, Q^{MAX}]$. The values may be divided up in intervals, or bins, equal or unequal depending on the range and the size of the dataset, resulting in a histogram. Representing the histograms as H(Q), a normalization factor $$N=\Sigma_{Q^{Min}}^{Q^{Max}} H(Q)$$

is used to ensure that $\Sigma_{-\infty}^{+\infty} H(Q)=1$, with the entry in each bin being $N_i^Q/N$. The probability of measuring Q between values $Q_i$ and $Q_j$ is given as $$P[Q_i,Q_j]=\Sigma_{Q_i}^{Q_j} H(Q).$$

The binning for both the reconstructed and the true values may be kept identical, such that a bin-by-bin comparison of values may be made. Fitting the median bin values of the normalized histogram to a continuous curve results in a probability density function P. The expectation value of measuring Q between $Q_i$ and $Q_j$ may be given as $$\int_{Q_i}^{Q_j} Q \times P(Q) dQ.$$

The correction factors 80 may be calculated. Given two histograms $H_T$ and $H_R$, the ratio $$\varepsilon = \frac{H_T}{H_R}$$

gives the ratio of the probabilities of reconstructing the quantity of interest Q and the probability of Q truly occurring in that range. If the reconstruction process is exactly reproducing the initial true values 82 of the quantity of interest Q, the distribution of ε will be constantly one (1). However, most reconstruction processes are non-linear transformations of the sensory inputs and associated systematic uncertainties. This results in some true values 82 belonging to bin i−1 and bin i+1 in the True histogram to be associated with bin i in the reconstructed distribution. This will result in a distribution of ε with value of ε≠1 for each bin. The formulation can now be represented as $$P_R=P_T \otimes \varepsilon. \quad \text{(Equation \#2)}$$

The Reconstructed probability density function (or "PDF") may now be interpreted as the convolution of the correction factor distribution ε and the True PDF. Note that the distribution ε is obtained from the discreet values $\varepsilon_i$.

Partitioning may be performed. A simple one step division to obtain ε will be highly dependent on the binning schema and may not profile the dependence the corrections may have upon the quantity of interest Q. Moreover, such a simple determination of ε may be generalizable to other data sets. Exemplary embodiments may thus iteratively determine the correction factor 80. Exemplary embodiments may split the true dataset into two disjoint sets $$Q_T=Q_T^{TR} \oplus Q_T^{Test}. \quad \text{(Equation \#3)}$$

The Truth dataset for the quantity of interest Q may be split into a training set and a test set. An identical binning process may be applied to both of the partitioned sets of data such that a bin-by-bin comparison is possible (as above explained). The training (TR) dataset is used to obtain the correction factors 80 while the test (Test) dataset is used to ensure that the method is generalizable.

Simulation may also be performed. It is assumed in the discussion above that the true value 82 of the distribution of $Q_T$ is known either by construction through simulated data or by using a cross-referenced measurement for the same quantity Q. For cases when such an independent measurement is not present or possible, exemplary embodiments may perform the alternative simulation approach to obtain the true values 82. When a cross-reference dataset is available, exemplary embodiments may perform a population or membership threshold comparison to ensure that the dataset is large enough to interpolate a smooth map between the true value 82 of Q and all the sensory data being used to measure Q. In either approach, the set of sensory input values $S_i$ for all possible $Q_T$ values can be available such that the reconstruction algorithm can be applied to obtain a corresponding value of Q. If an independent dataset is not available, a simulation of the signal data $S_{i(True)}$ (corresponding to predetermined or calculated $Q_T$ values with the same statistical properties as the signal data $S_{i(R)}$ for the $Q_R$ as measured by each of the sensors $S_i$) is generated. The set of simulated sensory data $S_{i(True)}$ may then be reconstructed using the exact same reconstruction algorithm as the real data. This new set will now be a dataset for Q for which true values are known a-priori by construction. The dataset so constructed is used as the true values $Q_T=R(S_{i(True)})$ and split for purposes of training and test for determining the correction factors 80.

Iteration per bin may also be performed. The observed values of Q are the reconstruction algorithm applied to the observed values $S_i$. Thus far is referred to as the Reconstructed value. Given the reconstruction algorithm may be applied to the simulated streams $S_{i(True)}$ as well, henceforth all simulated data will be denoted with Sim. The result of applying the reconstruction algorithm R on $S_i^{observed}$ stream results in the $Q_{iR}^{observed}$ whereas R acting on $S_i^{Sim}$ results in $Q_T$. The sensory data $S_i^{Sim}$ corresponding to the dataset $Q_T$ is obtained to apply the reconstruction algorithm R again on these values. At this point the reconstruction algorithm R has been applied twice. Exemplary embodiments may repeat application of the reconstruction algorithm R to obtain an $n^{th}$ iteration. On the new datasets $Q_{T_n}^{TR}$ the algorithm has been effectively applied n times, once to obtain the True distribution then re-used as input to obtain a new set of reconstructed values, each time dependent on the previous set of values as the input data. This can be represented as $$R(S_i^{Sim}) \to Q_T^{Sim}$$

$$Q_{T_2}^{Sim} \to S_i^{Sim(QT2)}$$

$$R(S_i^{Sim(QT2)}) \to Q_{T_3}^{Sim} \quad \text{(Equations \#4, \#5, \& \#6, respectively)}$$

or, in general, as $$R(S_i^{Sim(QTn)}) \to Q_{T_{n+1}}^{Sim} \quad \text{(Equation \#7)}$$

such that the reconstruction process is applied iteratively upon the dataset. The iterative application of the reconstruction algorithm R results in all the systematics associated with the reconstruction process to be reapplied to the initial True dataset. To quantify the effects of the reconstruction process, a bin-by-bin study of the effects of the iterative process is modeled. For each step in the iteration described above, a histogram of the subsequently reconstructed values with the exact same binning is also constructed. The ratio $$\varepsilon = \frac{H_{T_n}^{Sim}}{H_{T_{n+1}}^{Sim}}, \quad \text{(Equation \#8)}$$

is calculated, giving the distribution of the convolution of the $n^{th}$ iteration using the resulting histograms. Given the binning schema for the entire process may be identical for all the histograms, the values of $\varepsilon_n$ can be used bin-by-bin as a function of the iteration step. The values $\varepsilon_n^i$ corresponding to the $i^{th}$ bin for all the iterations n=[1, 2, . . . N] for any integer value in the Training set is used for training a fit function $f(n)$. An extrapolation to a value of $\varepsilon_{-1}^i$ for the n=−1 iteration is obtained using a figure of merit, $$x^{i2} = \sum_N \frac{(\varepsilon_n^i - f^i(n))^2}{\sigma_n^{i2}}$$

(Equation #9) where, the function $f^i(n)$ is the functional dependence of $\varepsilon$ on the iteration step n for the $i^{th}$ bin. The $\sigma_n^{i2}$ gives the total variance on $\varepsilon^i$ for the $n^{th}$ iteration propagated through the calculation of the total uncertainties associated with bin i in the histograms $H_{Tn+1}$ and $H_{Tn}$. A $\chi^{i2}$ is used for each bin for obtaining $\varepsilon_{n=-1}^i$ after a good fit $\chi^{i2}/nd \approx 1$ is established.

The test set may be generalized. The test set $Q_T^{Test}$ obtained from the True data is used to determine the functional form of $f(n)$ in Equation #9 that minimizes the error $E^{Test}$ defined as $$E^{Test} = 1 - \frac{\sum_{j=1}^{j=n}(\varepsilon_n^j - f^j(n))^2}{\langle \varepsilon^2(n) \rangle - \langle \varepsilon(n) \rangle^2}$$

(Equation #10) for the test dataset, after carrying out an identical iterative procedure as the training set.

The correction factors 80 may now be applied. The values of $\varepsilon_{-1}^i$ are the correction factors 80 associated with the $i^{th}$ bin. Let $Q^{Measured}$ represent a subsequent set of measurements of Q. To apply the correction factor 80 an identical binning of $Q^{Measured}$ is performed. For each bin value i of $Q^{Measured}$, a corresponding correction factor $\varepsilon_{-1}^i$ is calculated. The value of $Q_{Measured}^i$ is then corrected using $\varepsilon_{-1}^i$ to obtain a new value, $Q_{Corrected}^i = \varepsilon_{-1}^i \times Q_{Measured}^i$. The corrected histogram of values $Q_{Corrected}^i$ may be transformed into a PDF with the expectation value of measuring Q between $Q_i$ and $Q_j$ may be determined as $\int_{Q_i}^{Q_j} Q \times P(Q_{corrected}) \, dQ$.

Figure 7:
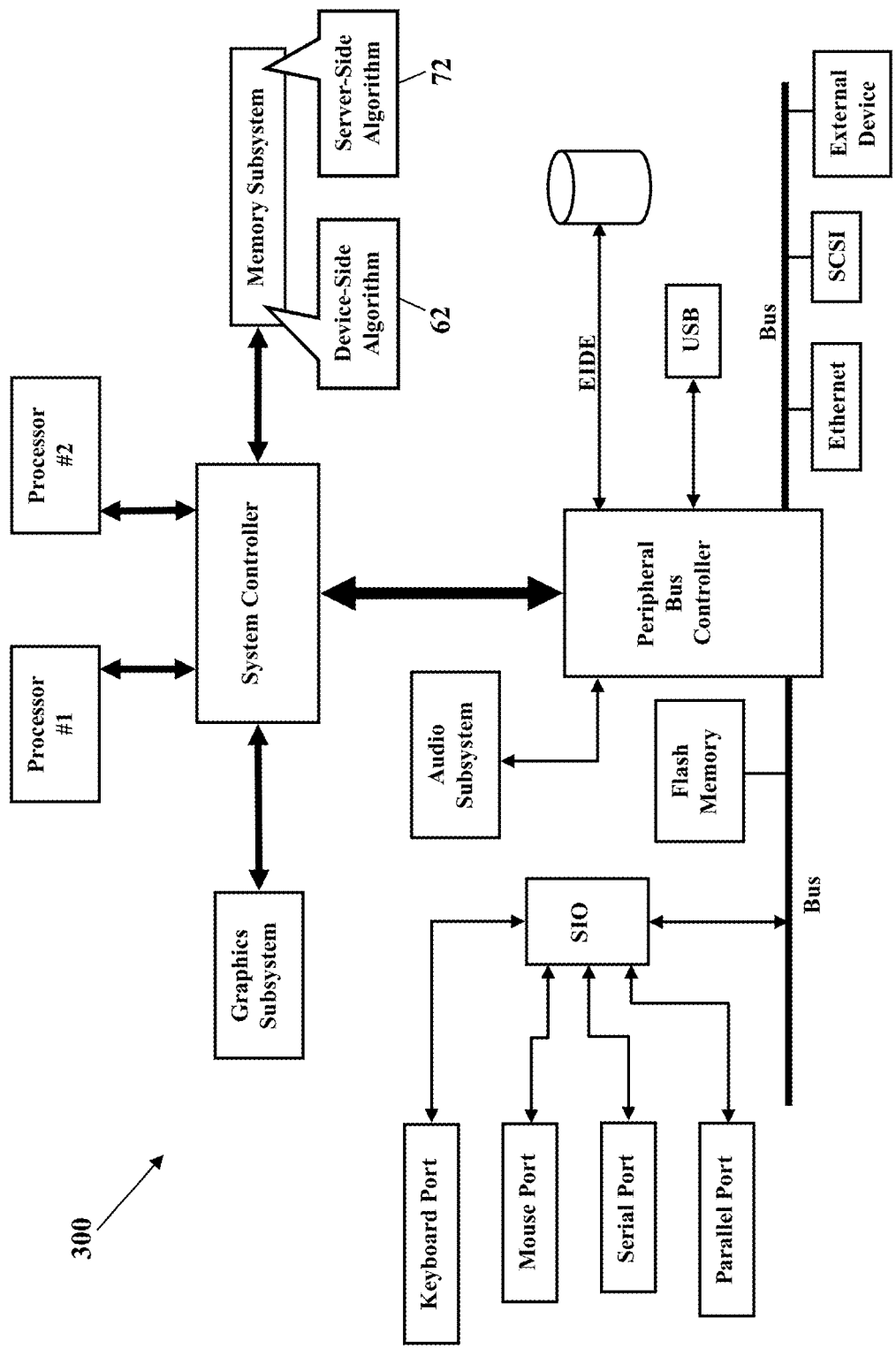
FIGS. 7-8 depict still more operating environments for additional aspects of the exemplary embodiments.

FIG. 7 is a schematic illustrating still more exemplary embodiments. FIG. 7 is a more detailed diagram illustrating a processor-controlled device 300. As earlier paragraphs explained, the server-side algorithm 72 and the device-side algorithm 62 may operate in any processor-controlled device. FIG. 7, then, illustrates the device-side algorithm 62 and the server-side algorithm 72 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Figure 8:
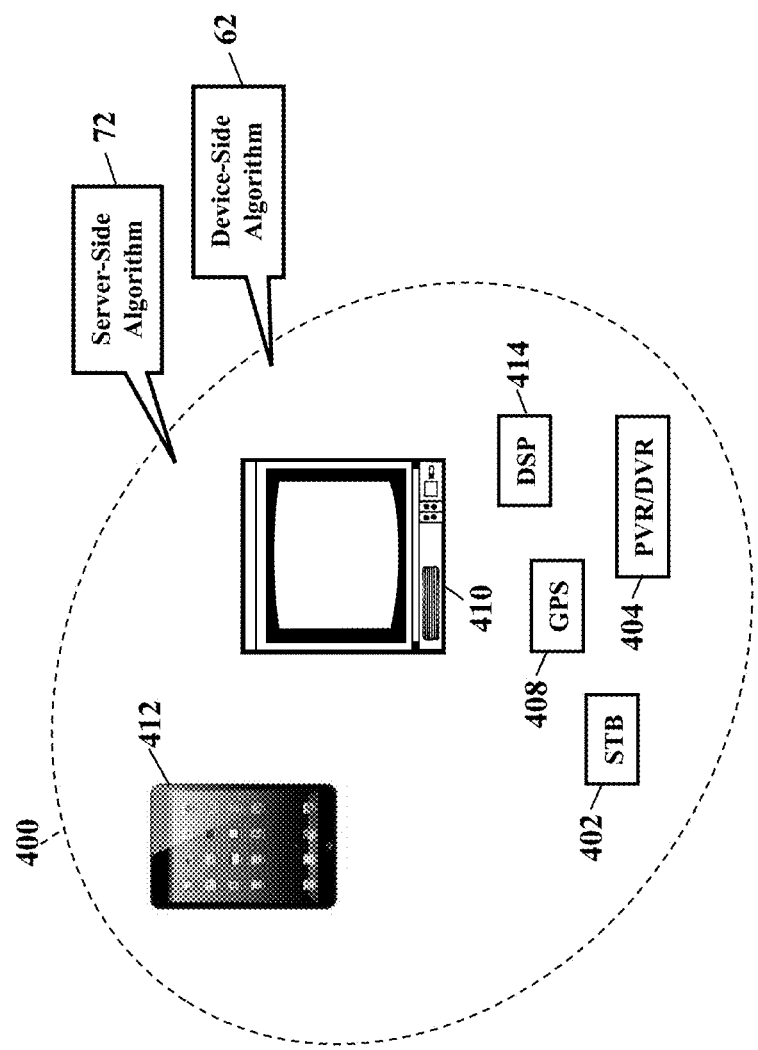

FIG. 8 depicts other possible operating environments for additional aspects of the exemplary embodiments. FIG. 8 illustrates the device-side algorithm 62 and the server-side algorithm 72 operating within various other devices 400. FIG. 8, for example, illustrates that the device-side algorithm 62 and the server-side algorithm 72 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 50 and/or a digital signal processor (DP/DSP) 414. The device 400 may also include network switches, routers, modems, watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 9:
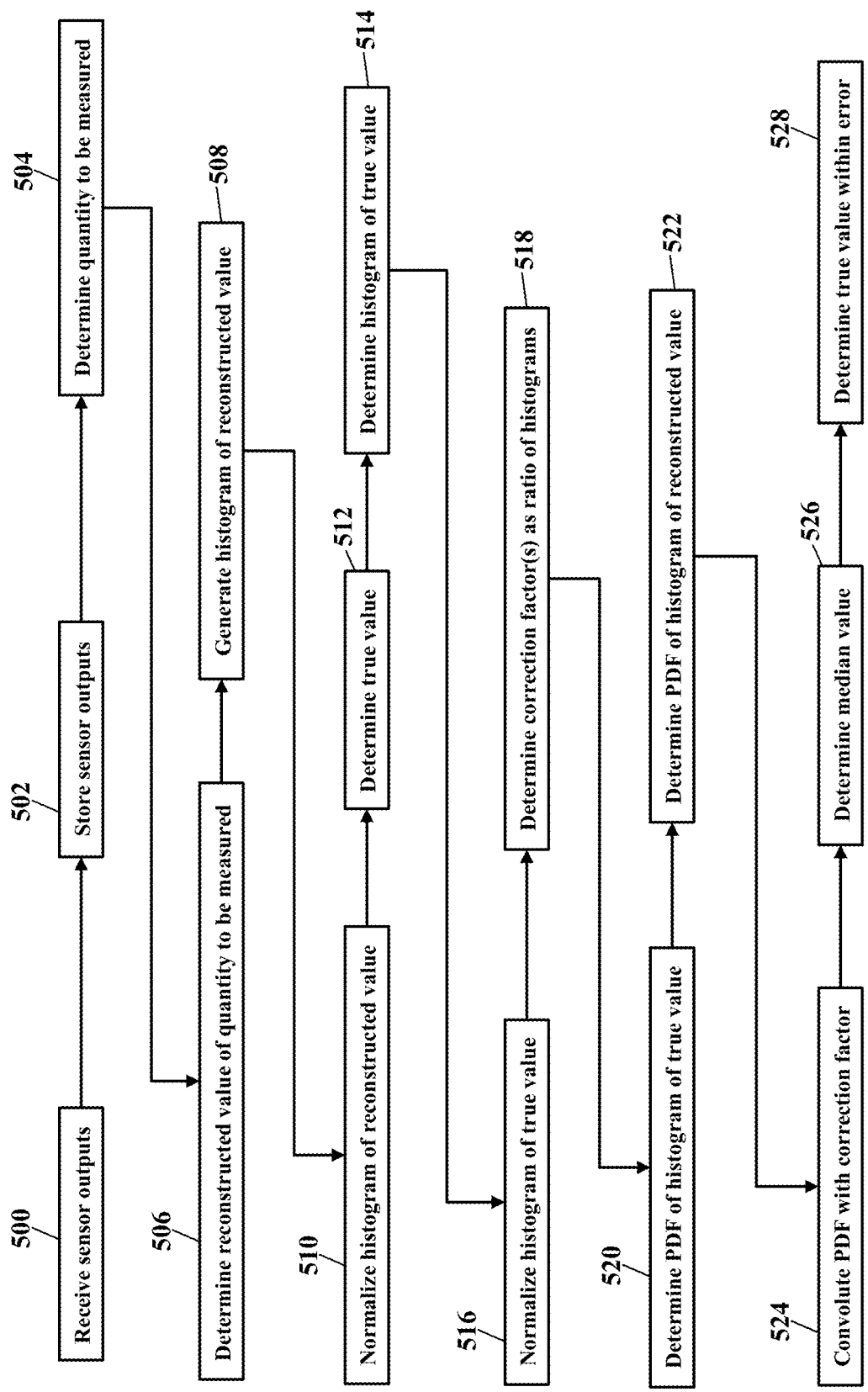
FIG. 9 is a flowchart illustrating a method or algorithm for sensory analysis, according to exemplary embodiments.

FIG. 9 is a flowchart illustrating a method or algorithm for sensory analysis, according to exemplary embodiments. The sensor outputs 28 are received (Block 500) and stored in the database 50 of sensory outputs (Block 502). The quantity to be measured is determined (Block 504) and the reconstructed value of the quantity to be measured is determined (Block 506). A histogram of the reconstructed value is determined (Block 508) and normalized (Block 510). The true value 82 is determined (Block 512). The histogram of the true value 82 is determined (Block 514) and normalized (Block 516). The correction factor(s) 80 are determined as a ratio of the histogram of the reconstructed value to the histogram of the true value (Block 518). The probability density function ("PDF") of the histogram of the true value 82 is determined (Block 520). The probability density function of the histogram of the reconstructed value is determined (Block 522). A convolution of the probability density function with the correction factor(s) 80 is determined (Block 524). Median values associated with the histograms are determined (Block 526). The true value 82 of the quantity to be measured is determined within the error 84 of the reconstructed value (Block 528).

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. Indeed, exemplary embodiments may be embodiment in any hardware device memory. This computer-readable medium, or media, could be distributed to end-subscribers, licensees, and assignees. A computer program product comprises processor-executable instructions for correcting sensory data, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a server comprising a processor, outputs produced by devices, each respective device of the devices comprising a respective sensor, and each output of the outputs produced from the respective sensor of the respective device;
   determining, by the server, a quantity to be measured from specified outputs of the outputs produced from the respective sensors;
   generating, by the server, simulated sensor data based on known values that are determined based on data from peer to peer communications between the devices, wherein values of the simulated sensor data is generated as representative of measured sensor data from the devices to be employed by a reconstruction process;
   determining, by the server, a reconstructed value of the quantity to be measured by applying the reconstruction process, using the simulated sensor data, to the specified outputs of the outputs produced from the respective sensors;
   determining, by the server, whether a value of the quantity to be measured lies within an error of the reconstructed value of the quantity to be measured; and
   in response to the value of the quantity to be measured being determined not to be within the error of the reconstructed value of the quantity to be measured,
      determining, by the server, a correction factor for application to at least one of the outputs produced from the respective sensors, and
      correcting, by the server, using the correction factor, the at least one of the outputs to obtain a corrected value of the quantity to be measured.

2. The method of claim 1, further comprising normalizing, by the server, a first histogram of the reconstructed value of the quantity to be measured.

3. The method of claim 2, wherein the correction factor is determined as a ratio of the first histogram of the reconstructed value to a second histogram of the value, and wherein applying the reconstruction process to the specified outputs of the outputs is performed iteratively.

4. The method of claim 3, further comprising determining, by the server, a probability density function of the second histogram of the value.

5. The method of claim 4, further comprising convoluting, by the server, the probability density function with the correction factor.

6. The method of claim 3, further comprising:
   facilitating, by the server, correcting, by at least one of the devices, and operation of the alt least one of the devices using the correction factor.

7. The method of claim 6, further comprising:
   calibrating, by the server, a specified output of the at least one of the outputs using the corrected value of the quantity to be measured.

8. A system, comprising:
   a processor; and
   a memory that stores executable instructions that, when executed by the processor, facilitate performance of operations, comprising:
      receiving outputs produced by devices, each associated device comprising a sensor, and each output produced from the sensor of the associated device;
      determining a quantity to be measured from particular outputs of the outputs produced from the sensors of the devices;
      generating simulated sensor data based on known values that are determined based on data from peer to peer communications between the devices, wherein the simulated sensor data is generated as representative of measured sensor data from the devices to be employed for a reconstruction;
      determining a reconstructed value of the quantity to be measured by applying the reconstruction, using the simulated sensor data, to the particular outputs of the outputs produced from the sensors of the devices; and
      determining whether a value of the quantity to be measured lies within an error of the reconstructed value of the quantity to be measured, and, responsive to the value of the quantity to be measured being determined not to be within the error of the reconstructed value of the quantity to be measured,
         determining a correction factor for application to at least one of the outputs produced from the sensors of the devices; and
         correcting, using the correction factor, the at least one of the outputs to obtain a corrected value of the quantity to be measured.

9. The system of claim 8, wherein the operations further comprise normalizing a first histogram of the reconstructed value of the quantity to be measured.

10. The system of claim 9, wherein the correction factor is determined as a ratio of the first histogram of the reconstructed value to a second histogram of the value, and wherein applying the reconstruction to the particular outputs of the outputs is performed iteratively.

11. The system of claim 10, wherein the operations further comprise determining a probability density function of the second histogram of the value.

12. The system of claim 11, wherein the operations further comprise convoluting the probability density function with the correction factor.

13. The system of claim 10, wherein the operations further comprise:
correcting an operation of at least one of the devices using the correction factor.

14. The system of claim 13, wherein the operations further comprise:
calibrating a particular one output of the at least one of the outputs using the corrected value of the quantity to be measured.

15. A non-transitory machine-readable medium, comprising executable instructions that, when executed by a processor of a device, facilitate performance of operations, comprising:
receiving a group of outputs produced by a group of devices, each associated device having a sensor, and each output produced from the sensor of the associated device;
determining a quantity to be measured from particular outputs of the group of outputs produced from the sensors of the group of devices;
generating a group of simulated sensor data based on a group of known values that are determined based on data from peer to peer communications between the group of devices, wherein the group of simulated sensor data is generated as representative of measured sensor data from the group of devices to be employed by a reconstruction algorithm;
determining a reconstructed value of the quantity to be measured by applying a reconstruction algorithm, using the simulated sensor data, to the particular outputs of the group of outputs produced from the sensors of the group of devices; and
determining whether a value of the quantity to be measured lies within an error of the reconstructed value of the quantity to be measured, and if the value of the quantity to be measured is determined not to be within the error of the reconstructed value of the quantity to be measured then:
determining a correction factor for application to at least one of the outputs produced from the sensors of the group of devices, and
correcting, using the correction factor, the at least one of the outputs to obtain a corrected of the quantity to be measured.

16. The non-transitory machine-readable medium of claim 15, wherein the operations further comprise normalizing a first histogram of the reconstructed value of the quantity to be measured.

17. The non-transitory machine-readable medium of claim 16, wherein the correction factor is determined as a ratio of the first histogram of the reconstructed value to a second histogram of the value, and wherein applying the reconstruction algorithm to the particular outputs of the group of outputs is performed iteratively.

18. The non-transitory machine-readable medium of claim 17, wherein the operations further comprise determining a probability density function of the second histogram of the value.

19. The non-transitory machine-readable medium of claim 18, wherein the operations further comprise convoluting the probability density function with the correction factor.

20. The non-transitory machine-readable medium of claim 16, wherein the operations further comprise determining a probability density function of the first histogram of the reconstructed value.

* * * * *